United States Patent [19]

Bezos

[11] Patent Number: 5,016,840
[45] Date of Patent: May 21, 1991

[54] METHOD TO AUTHORIZE A HEAD OF TRAIN UNIT TO TRANSMIT EMERGENCY COMMANDS TO ITS ASSOCIATED REAR UNIT

[75] Inventor: Angel P. Bezos, Rockville, Md.

[73] Assignee: Pulse Electronics, Inc., Frederick, Md.

[21] Appl. No.: 428,590

[22] Filed: Oct. 30, 1989

[51] Int. Cl.⁵ .............................................. B61L 23/00
[52] U.S. Cl. .............................. 246/187 R; 246/167 R
[58] Field of Search ............. 246/167 R, 187 R, 187 C

[56] References Cited

U.S. PATENT DOCUMENTS

| | | | |
|---|---|---|---|
| 3,380,399 | 4/1968 | Southard et al. | 246/167 R X |
| 3,588,186 | 6/1971 | Worbois | 246/167 R X |
| 3,696,758 | 10/1972 | Godinez, Jr. | 246/167 R X |
| 4,582,280 | 4/1986 | Nichols et al. | 246/187 R X |
| 4,652,057 | 3/1987 | Engle et al. | 246/182 R X |
| 4,692,867 | 9/1987 | Poole | 246/187 R X |
| 4,723,737 | 2/1988 | Mimoun | 246/167 R X |
| 4,885,689 | 12/1989 | Kane et al. | 246/167 R X |

Primary Examiner—Robert J. Spar
Assistant Examiner—Scott L. Lowe
Attorney, Agent, or Firm—Whitham & Marhoefer

[57] ABSTRACT

An EOT emergency arming apparatus and method in which an engineer at the HOT operates a standard air brake control and responds to a resulting report of change in air pressure from the EOT within a prescribed short interval. The response is a signal which includes the EOT unique identification code, and if received within the short interval is interpreted by the EOT as if the EOT ARM switch had been activated.

5 Claims, 6 Drawing Sheets

METHOD TO AUTHORIZE A HEAD OF TRAIN UNIT TO TRANSMIT EMERGENCY COMMANDS TO ITS ASSOCIATED REAR UNIT

BACKGROUND OF THE INVENTION

1. Field of the Invention

This invention relates to an improved method for authorizing a radio transmission of emergency commands from a head of train unit to its associated rear unit, and more particularly to a method which requires only one operator to execute the authorization procedure.

2. Description of the Prior Art

End of train (EOT) devices are in common use on several major railroads. These devices are typically mounted on the trailing coupler of the last car in the train and are equipped with pressure monitoring and telemetering circuitry. A hose is connected between the train's brake pipe and the EOT device so that the air pressure of the brake pipe at the end of the train can be monitored. A radio signal transmits the monitored pressure to a head of train (HOT) device mounted on the console in the locomotive cab. The HOT device provides the operator with a display of brake pipe pressure at the end of the train and, in response to a command from the EOT device, signals the operator that an emergency condition exists, such as a sudden loss of air pressure or air pressure falling below a predetermined level. When initially implemented by the railroads, transmissions were one way; from the end of the train to the head of the train only.

More recently, standards have been adopted by the railroad industry which allow two way radio transmissions in HOT/EOT systems. One application for a transmission from the HOT unit to the EOT unit is for the remote control of the emergency application of brakes at the end of the train. In a one way system, emergency application of the brakes starts at the locomotive and progresses along the brake pipe to the end of the train. This process can take a significant time in a long train, and if there is a restriction in the brake pipe, the brakes beyond the restriction may not be actuated. With a two way transmission system, emergency braking can be initiated at the end of the train at the same time as the initiation at the head of the train and the process of brake application can be considerably shortened. As will be appreciated by those skilled in the art, in order for an HOT unit to communicate emergency commands to an associated EOT unit, it is desirable for the HOT unit to be armed or authorized by railroad personnel. This is desirable to prevent one HOT from erroneously or maliciously actuating the emergency brakes in another train. To this end the HOT unit includes a nonvolatile memory in which a unique code identifying an EOT unit can be stored. The HOT also has a row of thumb wheel switches. The HOT is armed to transmit an emergency command to an EOT unit only when an operator at the HOT sets the thumb wheel switches to correspond to the EOT identifying code stored in the nonvolatile memory. The HOT unit retains the last used EOT identification code until re-armed for a different EOT.

To arm the system for a new EOT unit, an operator at the EOT unit pushes a test button which initiates a transmission of the EOT's unique identifier code along with a prescribed special message type identifier and confirmation bit. When the HOT unit receives the message initiated by the EOT push button, it displays an ARM NOW message at the HOT if the stored code differs from the identification code of the new EOT unit. The operator at the HOT must initiate a status update request by manually pushing the Communications Link push button within six seconds of the ARM NOW message display. The EOT unit is programed to respond to the status update request addressed to it if the request is received within six seconds from the time the EOT unit button was pushed. The response has a prescribed special message type identifier and confirmation bit. When the HOT unit receives the response, if the EOT identifier code corresponds to the code set by the thumb wheel switches, ARMED is displayed and the identification code of the new EOT unit is written into the nonvolatile memory in place of the previously stored code. At this point in the procedure the system is armed. This procedure is set forth in the 1989 Association of American Railroads Communications Manual, Part 12-15, pp. 38, 39.

This coordinated action arming procedure uses an operator at the end of the train to insure that the system is armed only by the EOT on the end of that particular train. It depends on operator intervention to associate the HOT unit with the proper EOT unit.

While generally satisfactory, the system has certain limitations. It requires two operators, one located at head of the train and the other located at the end of the train. In many operating situations there is no operator at the end of the train and someone has to be sent to the end of the train in order to arm the system. Not only is the two operator system inefficient when there is no operator at the EOT unit, but it also poses the small but real possibility of operator misidentification.

SUMMARY OF THE INVENTION

An object of this invention is the provision of an improved arming method which can be implemented by one operator at the HOT unit while maintaining or improving the operating integrity of the system and at the same time introducing no changes or only minimal changes in existing procedures.

Briefly, this invention contemplates an EOT emergency arming method in which an engineer at the HOT operates a standard air brake control and responds to a resulting report of change in air pressure from the EOT within a prescribed short interval. The response is a signal which includes the EOT unique identification code, and if received within the short interval is interpreted by the HOT as if the EOT ARM switch had been activated.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENT OF THE INVENTION

Figure 1:
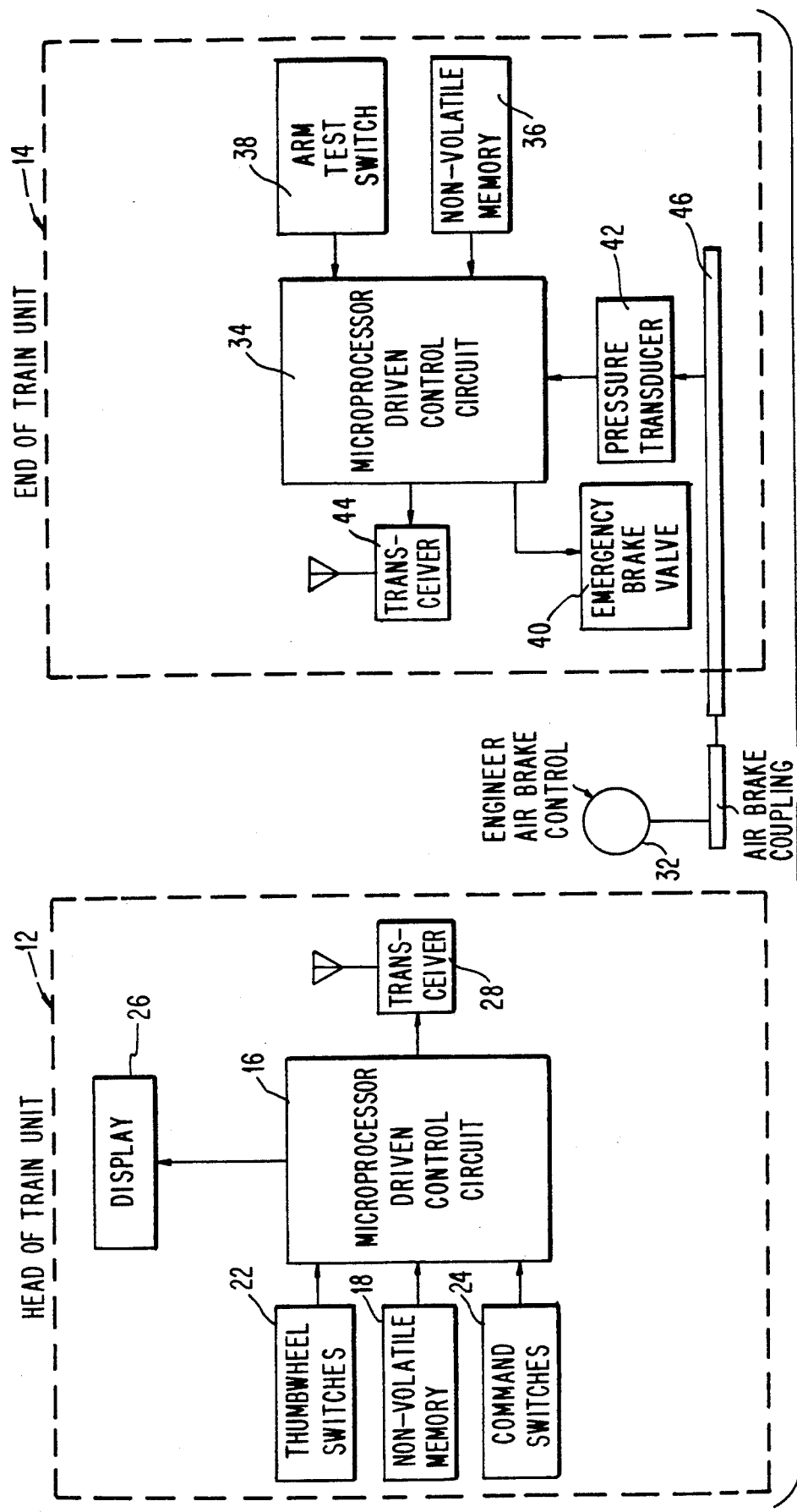
FIG. 1 is a block diagram of an improved system in accordance with the teachings of this invention.

Referring now to the drawings, in which the same reference numeral indicates the same element in the various figures, FIG. 1 shows a head of train (HOT) unit 12 and an end of train (EOT) unit 14 mechanically linked together by a train. The HOT unit includes microprocessor control circuit 16, a nonvolatile memory 18, and a series of thumb wheel switches 22 through which an operator stationed at the HOT can manually enter the unique code number of the EOT unit 14. In addition to inputs from the thumb wheel switches and nonvolatile memory, the processor 16 also has a command switch input 24 and outputs to a display 26 and transceiver 28. A locomotive engineer controls air brakes via the normal locomotive air brake controls, indicated schematically at 32, and the normal air brake coupling 46 which extends the length of the train.

The end of train unit 14 includes a microprocessor controller 34, and a nonvolatile memory 36 in which the unique identifier code of the particular end of train unit 14 is stored. The microprocessor 34 also has inputs from a manually activated arming switch 38 and a brake pressure responsive transducer 42 and an output to an emergency brake control unit 40. The end of train unit 14 communicates with the head of train unit 12 by way of a radio broadcast transceiver 44. The HOT/EOT two way communication and control systems described above is described in more detail in abandoned application Ser. No. 07/313,877 filed Feb. 23, 1989, assigned to the same assignee as this application, and incorporated herein by reference.

As will be appreciated by those skilled in the art, the air brake coupling 46 mechanically couples the head of train unit 12 to the rear of train unit 14. As disclosed in U.S. Pat. No. 4,582,280, since this mechanical coupling is unique to a particular train, it can be used by the HOT unit to verify through physical connection that the EOT is properly linked for communication.

Figure 2A:
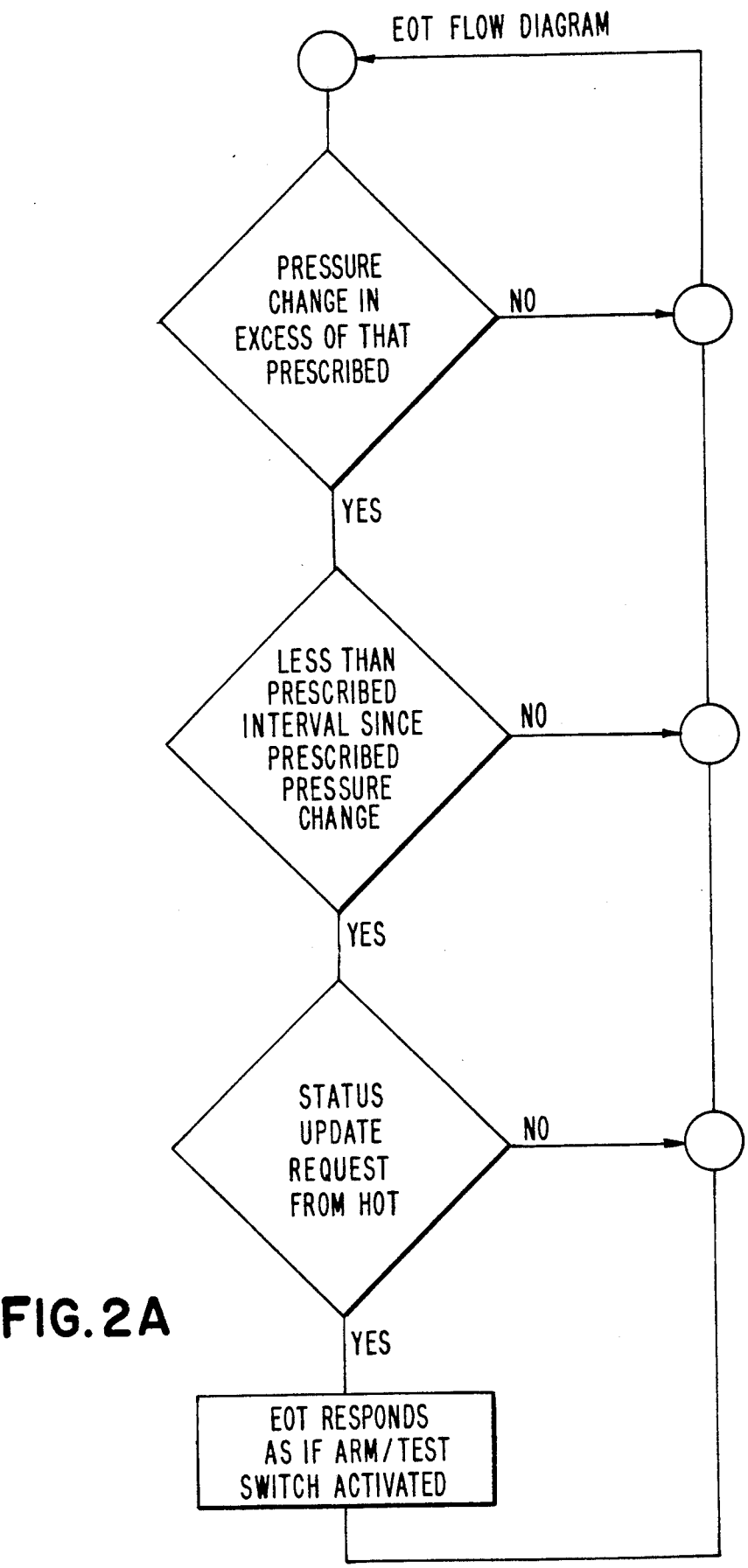
FIGS. 2A and 2B are flow diagrams of steps to initiate arming in accordance with one embodiment of the invention.
Figure 2B:
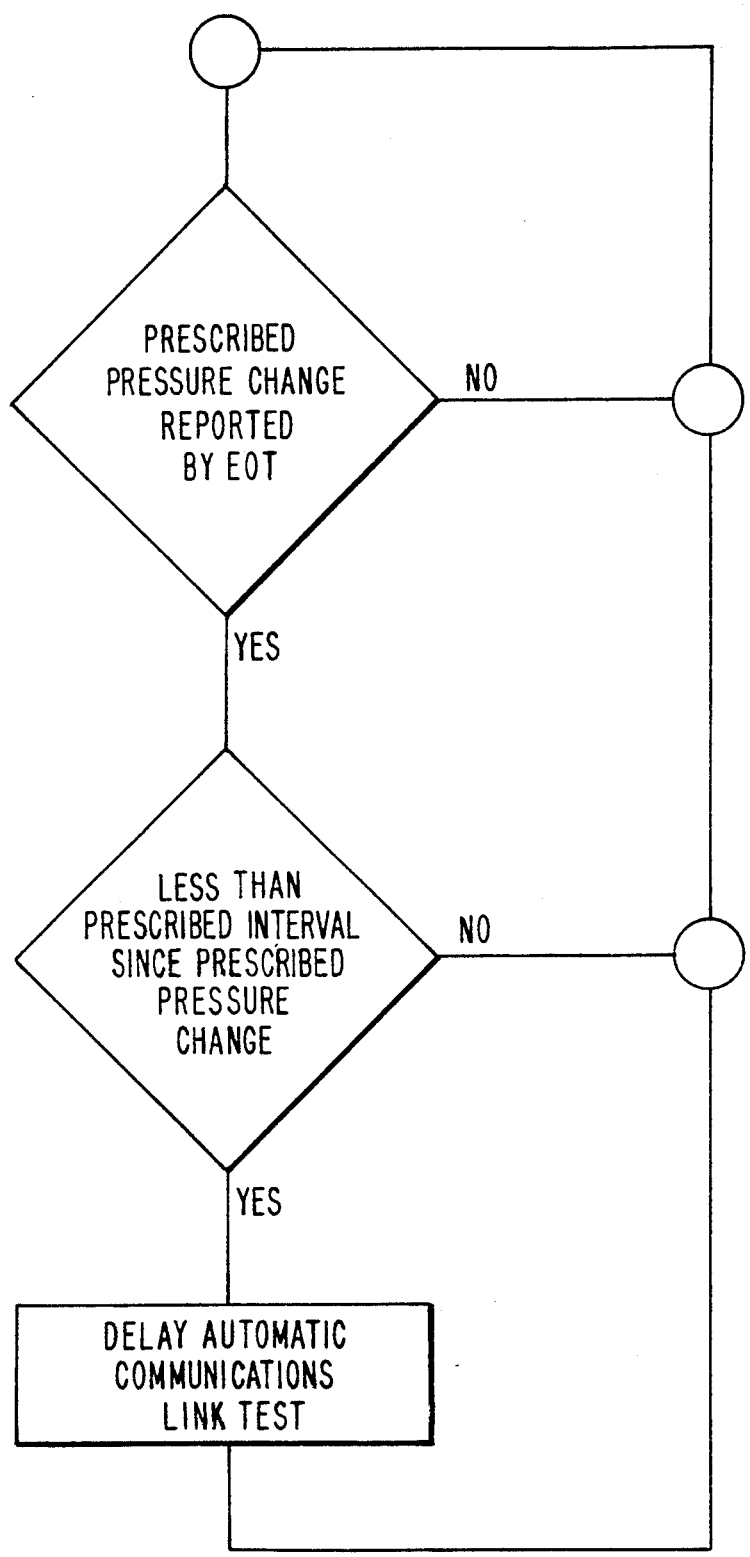

Referring now to FIG. 2, in addition to FIG. 1, in operation, two way communication is initially established between the head of train unit 12 and the rear of train unit 14 using standard procedures such as those proscribed in the Association of American Railroads Communication Manual which enable two way Communications Link testing. It will be appreciated that the establishment of the communications link permitting two way testing does not ARM the system and the HOT unit cannot initiate an emergency braking procedure. In accordance with the teachings of this invention, to ARM the system an operator at the HOT unit dials in the EOT's identifier code on the thumb wheel switches 22. By using locomotive controls 32, the operator also effects a change in pressure in coupling 46 that travels to the rear of the train and is sensed by the EOT. This change in pressure, for example a four pound reduction in pressure, is detected by transducer 42. Processor 34 processes this input data and transmits information indicative of the pressure change via the radio transmission link which includes transceivers 44 and 28.

After receipt of the signal from the EOT unit, the change in pressure will be indicated on the display 26. The EOT ARM program requires the operator at the HOT unit to generate a manually initiated test signal transmission to the EOT within a prescribed short interval, for example the operator must initiate a Manual Communication's Link Test within six seconds of the display of the pressure change signalled from the EOT unit. In accordance with the teachings of this invention, if the EOT receives this signal within the prescribed time after receipt of the pressure change exceeding a prescribed amount, it responds as if its ARM test button 38 had been manually pushed by an operator, and the ARM procedure can proceed as in the prior art where the button is actually pushed. This procedure is described above in connection with the prior art and is also described in detail in the Association of American Railroads Communication Manual referred to above. If the signal is received after the prescribed interval, it is interpreted as a standard HOT request and acted upon as such. The arming procedure is not carried out.

As will be appreciated by those skilled in the art, the Manual Communications Link Test is a protocol command of existing systems which may be activated by the engineer manually activating a push button or switch on the HOT unit. This embodiment has the advantage of allowing the system of this invention to be used with existing protocols. In existing HOT units this same Communications Link Test protocol is also transmitted automatically at intervals of about five or ten minutes. To provide further security to the system, this automatically initiated communications link test may be delayed following any reported pressure change exceeding the prescribed amount, as shown in the FIG. 2B flow diagram.

Figure 3:
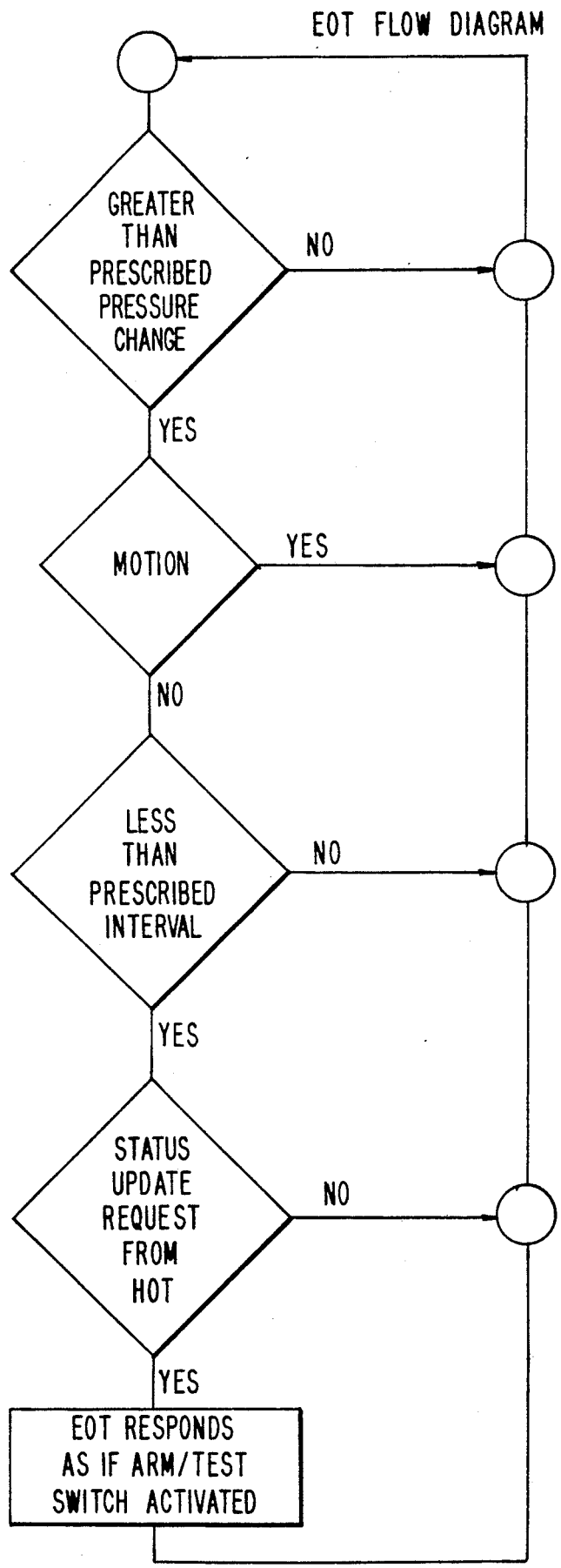
FIG. 3 is a flow diagram of an alternative embodiment of the invention.

As will also be appreciated by those skilled in the art, existing EOT units have motion detectors to detect motion of the train. FIG. 3 is a flow diagram of an embodiment of the invention in which the arming procedure is aborted if motion is detected. The embodiment gives added security, as the EOT is normally armed only when the train is stationary.

Figure 4A:
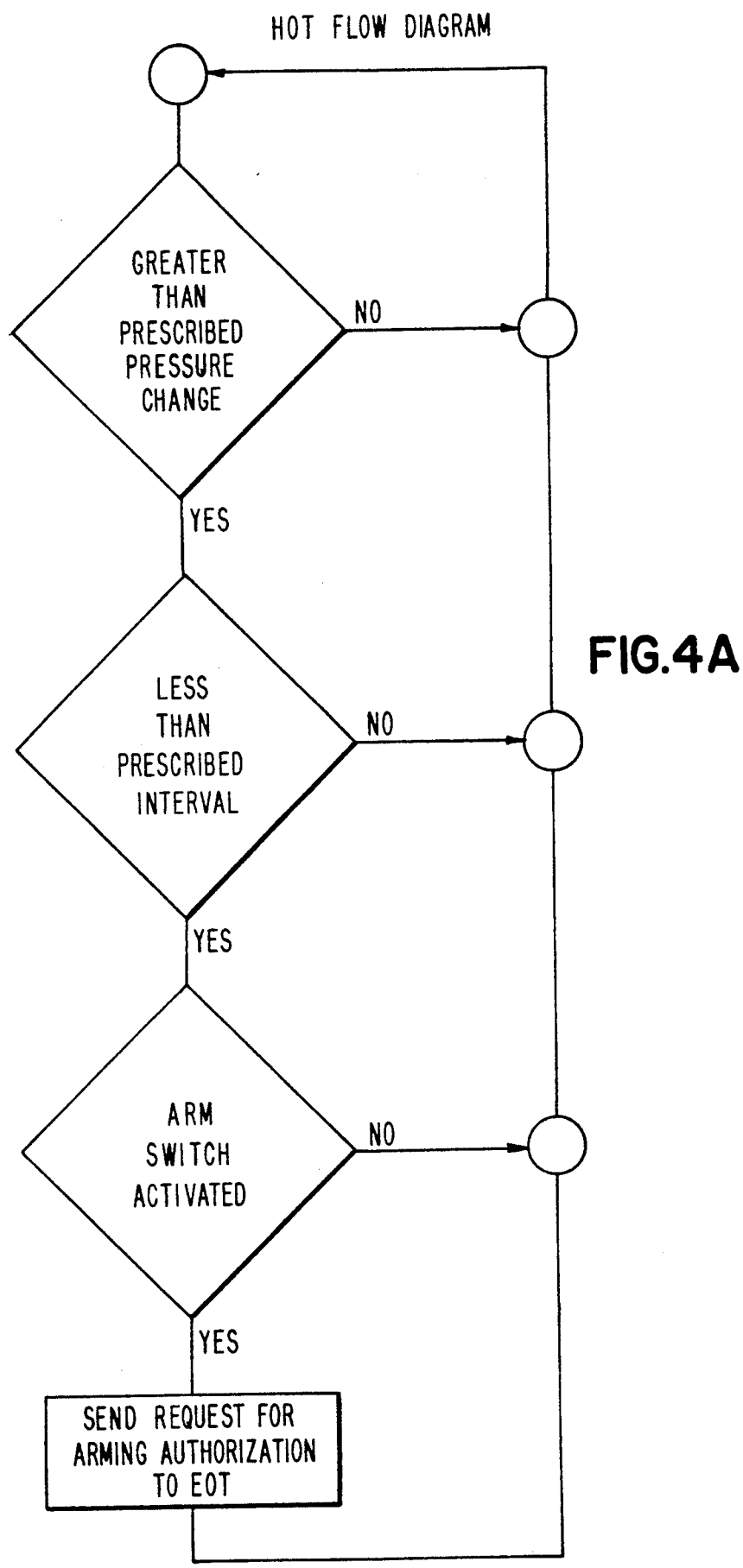
FIGS. 4A and 4B are flow diagrams of yet another embodiment of the invention.
Figure 4B:
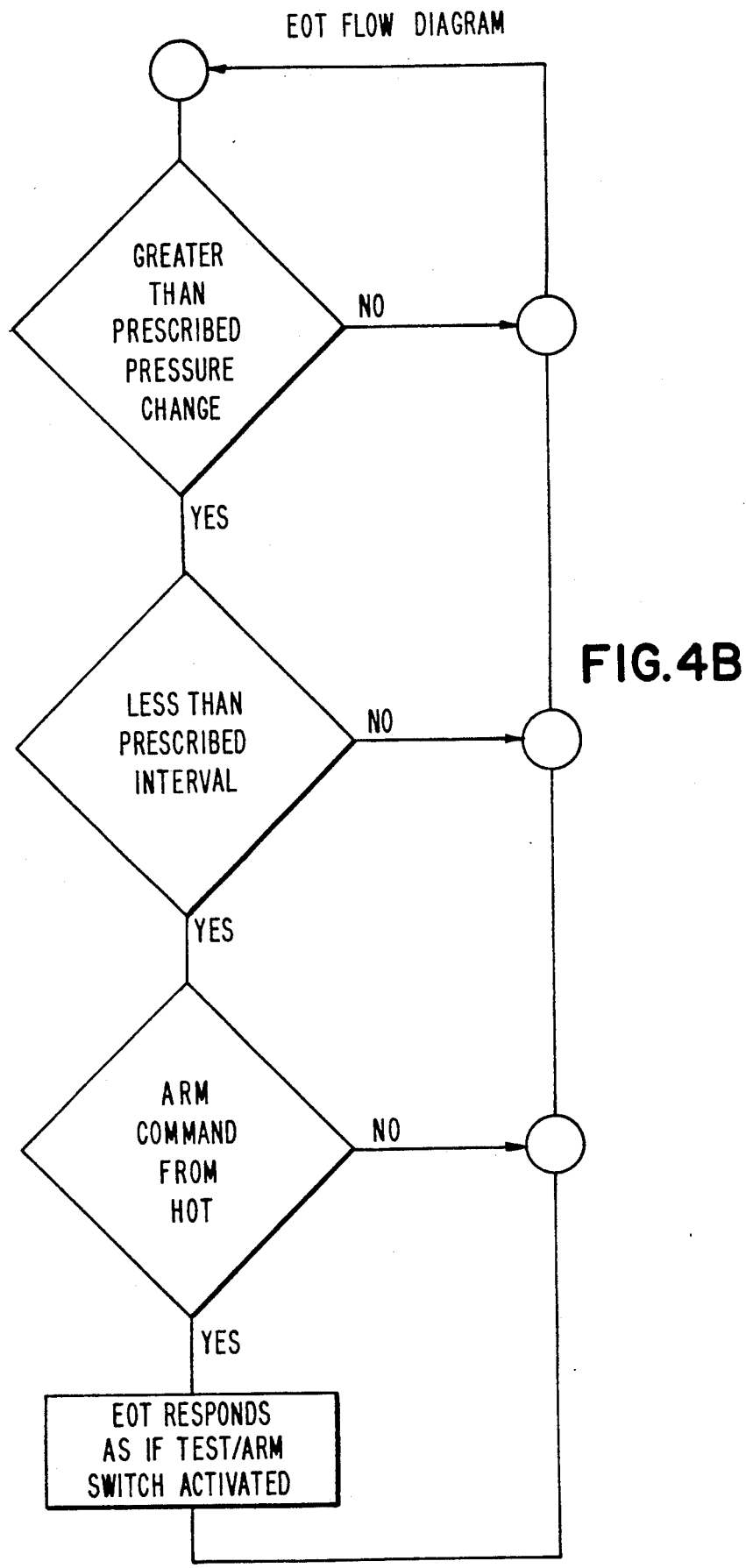

FIGS. 4A and 4B are flow diagrams for a system similar to that previously described but one in which a special manually operable switch and associated protocol signal have been added and function in addition to the Manual Communications Link Test switch and protocol of the previously described embodiments.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for arming a head of train unit to control emergency functions at a rear of train unit upon command over a telecommunication unit link, comprising the steps of:

manually initiating at the head of train unit a change in pressure in the brake pressure pipe coupled between the head of train unit and the rear of train unit;

sensing at said rear of train unit said change in pressure;

transmitting from said end of train unit an indication of said change in pressure to said head of train unit;

displaying said indication of said change in pressure at said head of train unit; and manually initiating the transmission of a predetermined signal to said end of train unit over said telecommunications link within a predetermined short time interval following the display of said pressure change.

2. A method for arming a head of train unit as in claim 1 wherein said predetermined signal is a standard Manual Communications Test Link signal.

3. A method for arming a head of train unit as in claim 2 further including the step of inhibiting automatic transmission of a Communications Test Link signal.

4. A method for arming a head of train unit as in claim 1 wherein said predetermined signal is a special arming signal.

5. A method for arming a head of train unit as in claim 1 including further the step responding to said predetermined signal and transmitting to said head of train unit over said telecommunications link an identifier specifically for arming the system to allow the end of train unit to respond to emergency control commands from the head of train unit when said manually initiated predetermined signal is received at said end of train unit within a predetermined short interval follow said pressure change.

* * * * *